Jan. 21, 1958 R. M. FRASER 2,820,251
MOULDS FOR VULCANIZING RUBBER OR PLASTIC SOLES TO FOOTWEAR
Filed July 3, 1956 2 Sheets-Sheet 1

INVENTOR:
ROBERT MARTIN FRASER
BY
Richardson, David and Nordon
ATTY'S.

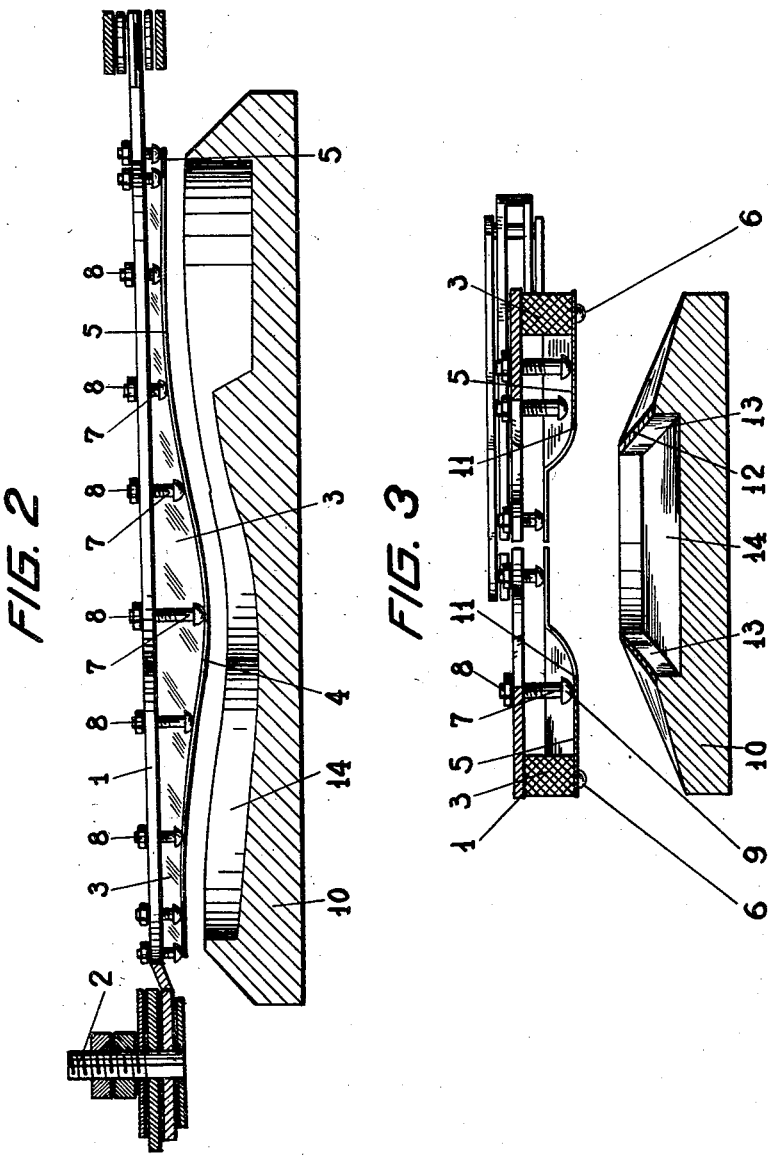

United States Patent Office 2,820,251
Patented Jan. 21, 1958

2,820,251

MOULDS FOR VULCANIZING RUBBER OR PLASTIC SOLES TO FOOTWEAR

Robert Martin Fraser, Buenos Aires, Argentina, assignor to Fabrica Argentina de Alpargatas S. A. I. C., Buenos Aires, Argentina, a corporation of the Argentine Republic Application July 3, 1956, Serial No. 595,700

7 Claims. (Cl. 18—34)

The present invention relates to improvements in moulds for vulcanizing rubber or plastic soles to footwear.

This invention is an improvement on the mould for vulcanizing rubber soles which has been disclosed in U. S. patent application Ser. No. 255,985, filed November 13, 1951, and which comprized a metallic flexible sheet projecting from over the lateral wall of the sole moulding cavity, in such a manner that the edges of the flexible sheet surround the lower part of the footwear carrying last placed over the cavity, and take contact with said last.

This device allowed for the pressure exerted by a press on the upper part of the last, to be transmitted not only to the sole-forming mixture, but also against the edge of the metallic sheet which, being flexible, pressed on one side the upper edge of the internal face of the cavity, and on the other side against the lower part of the upper placed in the last. In this manner an hermetic seal was formed which did not allow the flow of the fluid rubber during the vulcanizing operation.

This mould has provided excellent results for vulcanizing substantially flat soles, as for example rubber soled sports footwear. In these instances the metallic flexible sheet was substantially flat and, therefore, the pressure of the last was uniformly distributed around the whole edge of the sheet, notwithstanding it being formed by two or more side by side elements.

In the case of heeled footwear, the upper face of the base-plate having the moulding cavity, and the metallic sheet must have an S profile adapted to the shape of the platform which is determined by the upper face of a heeled sole.

In these cases the manufacture of the flexible sheet, formed generally by two parts placed against the perimeter of each half of the footwear, had some drawbacks. Its own flexibility made very difficult to preserve a given curved shape, and therefore, such sheets were easily deformed. From this it resulted that the hermetic seal sought could not be properly attained.

The present invention tends to surmount said drawbacks and shape said flexible metallic sheets in a substantially indeformable manner, and moreover, if some deformation occurs, to be able to quickly rectify it.

Other object of the invention is to facilitate the manufacture of said curved laminar seals.

The improvement to which the present invention relates mainly consists in mounting a flexible curved metallic sheet in a flat frame, securing the sheet to the frame by its outer edge, through a cushion of elastic hard material, and to screw in said frame a plurality of round-headed screws, in such a manner that said heads come to rest against the flexible sheet at some distance from its edge. These screws act to maintain the desired curvature in the flexible plate and, eventually, are capable to correct any ulterior deformations.

For a better understanding of the invention, it will be now described with reference to the accompanying drawings which show a non-limitative embodiment. In the drawings:

Fig. 2 is a longitudinal sectional view of said frame and the mould-carrying base-plate for the sole and heel; and Fig. 3 is a transverse sectional view of the frame and base-plate shown in Fig. 2.

Figure 1:
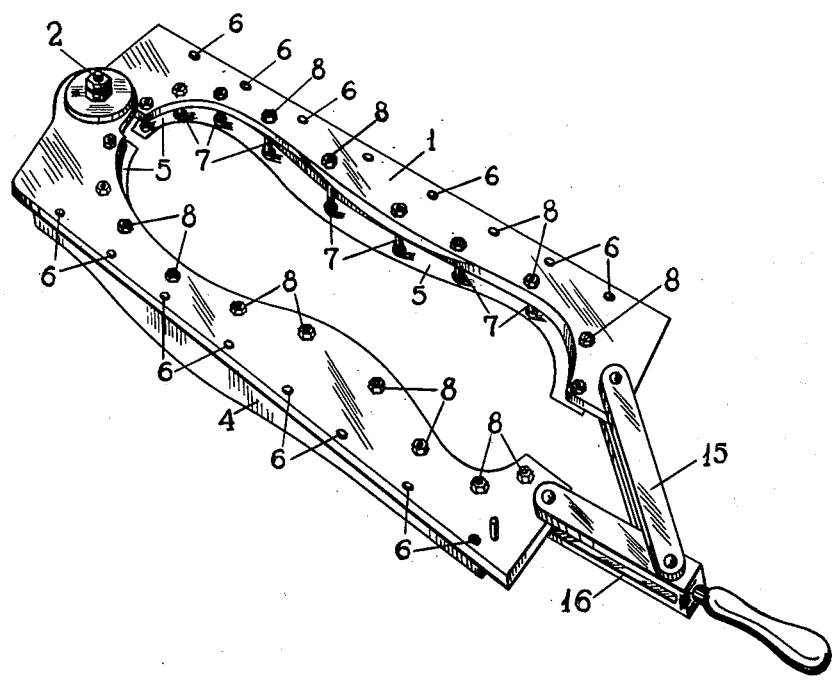
Fig. 1 is a perspective view of the frame carrying the flexible sheet.

As it can be seen from the drawings that a frame 1, formed by two identical sections and symmetrically hinged around an axis 2, carries in each section and against the outer edge of its sides, hard elastic material members, the lower face of each shows an undulated surface 4 which corresponds to the curvature of the flexible metal sheet 5. This sheet 5 is secured to frame 1 with mediation of a member 3, by means of rivets 6 (see Fig. 3).

A plurality of screws 7 are screwed to frame 1. These screws being maintained in position by means of lock-nuts 8 and having hemispherical head 9 which rest at some distance of the edge of the flexible metal sheet (see Fig. 3) so as to allow for the free flexing movement of said edge. By means of this device, if the metal sheet 5 is secured against member 3 with some tilt towards frame 1 (which can easily be done by giving to member 3 the correct transversal profile), heads 9 of screws 7 will form abutments which will maintain the edge of flexible plate 5 in the desired curved position.

Frame 1 with its flexible metallic sheet is placed over body 10 of the vulcanizing mould (Figs. 2 and 3) in such a manner that, according to the disclosure of application No. 255,985, the free edges 11 rest against the upper part 12 of the wall 13 of the sole moulding cavity of mould 14, and protrude innerwards, perimetrically covering part of the cavity of mould 14 (Fig. 3).

In this manner, as in the parent case, the upper-carrying last, which is placed resting against the edge 11 of flexible sheet 5, will flex, on being pressed, said edge adjusting it against the edge 14 of the moulding cavity.

In the drawings frame 1 is shown (Fig. 1) divided into two symmetrical sections hinged around an axis 2. The set of levers 15 and 16 serve to open and close the frame. This resource is common in other type of moulds.

It is clear that frame 1 may not be sectioned or be sectioned in more than two parts.

Also, frame 1 and mould 10 can be provided with guiding means to cooperate in the correct positioning of frame 1, with its flexible sheet over cavity of mould 14, or hinged to one another.

Body 10 can be provided with any of the common heating elements, steam-ducts, electrical resistance, burners, etc.

What I claim is:

1. In combination, a frame associated with a rubber sole vulcanizing mold, said frame comprising a pair of flat, elongated members hinged together at one end thereof, means for locking the members together at their other ends, said members comprising coplanar portions having inner edges having an outline substantially coincident with the edge contours of a rubber sole, a pair of flexible metal strips respectively associated with said members and located beneath the under surface thereof, said strips having inner edges with an outline similar to that of said members and projecting inwardly slightly beyond the inner edges of said members, elastic spacers between each of said members and the strip associated therewith, means for securing said members and the strip and spacer associated therewith at their outer edge portions, said spacers varying in thickness along the length thereof whereby the associated flexible strips are curved relative to the overlying members, and means along the inner edge portions of said members operatively related to the inner edge portions of said strips for varying the curvature of the inner edge portions of said strips relative to said members.

2. The combination as in claim 1, wherein said spacers extend the length of said members, said spacers having a planar upper surface in contact with the under surface of said members and a curved lower surface in contact with said strips.

3. The combination as in claim 1, wherein said spacers are elastic.

4. The combination as in claim 1, wherein said last mentioned means comprises a plurality of abutment members movably mounted in spaced arrangement along the inner edge portions of said flat members, the lower ends of said abutment members abutting the inner edge portions of said strips and means for locking said abutment members in adjusted vertical positions thereof.

5. In combination, a frame associated with a rubber sole vulcanizing mold, said frame comprising a pair of elongated members, means for hinging said members together at one end thereof, means for locking said members together at the other ends thereof, said members having coplanar portions with inner edges having an outline substantially coincident with the edge contour of a rubber sole when said members are locked together, a pair of flexible metal strips respectively secured to the underside of said members at the outer edges thereof, said strips having inner edges with an outline similar to that of said members and projecting slightly beyond the inner edges of said members, means for spacing said strips from said members at the outer edges thereof, said spacer means having an undulating contour at the lower surface thereof whereby to impart a fixed undulating contour to said strips, and means along the inner edges of said members and in abutting relation to the inner edge portions of said strips for varying the undulation of the inner edge portions of said strips.

6. A combination as in claim 5, wherein said last mentioned means comprises a plurality of screw means threaded into spaced openings along the inner edge of said members, said screw means having head portions at the lower ends thereof in abutment with the inner edge portions of said strips, and lock nut means on said screw means for locking said screw means in vertically adjusted positions thereof.

7. A combination as in claim 5 wherein said spacer means is elastic.

References Cited in the file of this patent

FOREIGN PATENTS

| | | |
|---|---|---|
| 818,542 | France | June 21, 1937 |
| 1,104,976 | France | June 22, 1955 |
| 1,106,039 | France | July 13, 1955 |
| 581,289 | Germany | July 25, 1933 |
| 714,149 | Great Britain | Aug. 25, 1954 |